United States Patent
Matsumoto et al.

(10) Patent No.: US 7,358,302 B2
(45) Date of Patent: Apr. 15, 2008

(54) COMPOSITION FOR LIGHT-SCATTERING FILM AND LIGHT-SCATTERING FILM USING THE SAME

(75) Inventors: Yasuki Matsumoto, Tokyo (JP); Kana Okazaki, Tokyo (JP); Masayuki Kawashima, Tokyo (JP); Hiromitsu Ito, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 338 days.

(21) Appl. No.: 11/012,234

(22) Filed: Dec. 16, 2004

(65) Prior Publication Data

US 2005/0130063 A1 Jun. 16, 2005

(30) Foreign Application Priority Data

Dec. 16, 2003 (JP) ............................. 2003-417858

(51) Int. Cl.
*G03F 7/38* (2006.01)
(52) U.S. Cl. .................... 525/50; 430/270.1; 430/907; 524/500; 524/544
(58) Field of Classification Search ................ 525/50; 524/500, 544; 430/270.1, 909
See application file for complete search history.

(56) References Cited

U.S. PATENT DOCUMENTS 6,123,442 A * 9/2000 Freier et al. ................ 362/559
6,139,767 A * 10/2000 Yamamoto et al. ......... 252/180
6,794,110 B2 * 9/2004 Breyta et al. ............. 430/270.1
2004/0191200 A1 * 9/2004 Lezer et al. ............. 424/70.11
2004/0257420 A1 * 12/2004 Ichizawa et al. ............ 347/100

FOREIGN PATENT DOCUMENTS

| JP | 200-169658 | * | 6/2000 |
| JP | 2000-169658 | * | 6/2000 |
| JP | 2001-194514 | | 7/2001 |
| JP | 2002-258014 | * | 9/2002 |
| JP | 2002-258274 | | 9/2002 |
| JP | 2003-335956 | * | 11/2003 |

* cited by examiner

*Primary Examiner*—Peter D. Mulcahy
*Assistant Examiner*—Henry S. Hu
(74) *Attorney, Agent, or Firm*—Nixon & Vanderhye P.C.

(57) ABSTRACT

A composition for a light-scattering film contains fluorine-containing resin fine particles each including a copolymer of a first ethylenically unsaturated monomer containing fluorine with other ethylenically unsaturated monomer component, and having an average particle diameter of 0.8 to 5.0 μm; and a transparent resin having a refractive index of 1.50 to 1.70. Where the other ethylenically unsaturated monomer component is formed of a second ethylenically unsaturated monomer containing no fluorine nor hydrophilic group, the copolymer contains 10 to 60% by weight of the first monomer, and 90 to 40% by weight of the second monomer. Where the other ethylenically unsaturated monomer component is formed of the second monomer and a third ethylenically unsaturated monomer containing a hydrophilic group, the copolymer contains 10 to 90% by weight of the first monomer, 89 to 5% by weight of the second monomer and 1 to 10% by weight of the third monomer.

7 Claims, No Drawings

COMPOSITION FOR LIGHT-SCATTERING FILM AND LIGHT-SCATTERING FILM USING THE SAME

CROSS-REFERENCE TO RELATED APPLICATIONS

This application is based upon and claims the benefit of priority from prior Japanese Patent Application No. 2003-417858, filed Dec. 16, 2003, the entire contents of which are incorporated herein by reference.

BACKGROUND OF THE INVENTION

1. Field of the Invention

The present invention relates to a composition for a light-scattering film used for forming a light-scattering film included in a reflection type liquid crystal display device and to a light-scattering film.

2. Description of the Related Art

In recent years, liquid crystal display devices have been widely propagated, large-scaled and come to be used outdoors. Thus, improvements have been required for the liquid crystal display devices in respect of, for example, weatherability, visibility, resistance to stains and resistance to heat under the conditions under which the liquid crystal display devices are used. Particularly, an improvement in the visibility is important, because the visibility is related to the main function of the liquid crystal display devices. Accordingly, extensive studies are being made in an attempt to improve the visibility of liquid crystal display devices.

For example, in a reflection type liquid crystal display device, e.g., an anti-reflection film, a light diffusion film and a light-scattering film, in which fine particles having a refractive index different from that of the base resin are dispersed in a base resin, are provided to control the reflection, diffusion and scattering of light, in order to improve the visibility.

More specifically, the reflection type liquid crystal display device requires a light reflector for reflecting, e.g., indoor light and external light, which are incident on the device. Two functions, i.e., light reflecting function and light scattering function, are required for the reflector. A light-scattering film is used as a member performing the light scattering function. This film comprises a transparent resin in which fine particles different from the transparent resin in refractive index are dispersed. For example, Japanese Patent Disclosure (Kokai) No. 2001-194514, Japanese Patent Disclosure No. 2002-258014 and Japanese Patent Disclosure No. 2002-258274 disclose a light-scattering film in which transparent particles (for example, inorganic particles such as silica particles or alumina particles or resin particles such as silicone resin particles, melamine resin particles or fluororesin particles) are dispersed in a transparent resin such as an acrylic resin, a fluoroacrylic resin, or an epoxy acrylic resin.

Excellent light scattering properties and excellent light transmitting properties are required for the light-scattering film. The light scattering film exhibits better light scattering properties when difference in the refractive index between the base resin and the fine particles are larger. The light scattering properties are greatly influenced by the particle diameter and the particle size distribution of the fine particles.

However, the conventional light-scattering film was not sufficiently satisfactory in respect of the light scattering properties and the surface smoothness.

BRIEF SUMMARY OF THE INVENTION

An object of the present invention is to provide a light-scattering film excellent in the light scattering function and in the surface smoothness, and to provide a composition for a light-scattering film used for forming such a light-scattering film.

According to a first aspect of the present invention, there is provided a composition for a light-scattering film, comprising: fluorine-containing resin fine particles each comprising a copolymer of 10 to 60% by weight of a first ethylenically unsaturated monomer containing fluorine with 90 to 40% by weight of a second ethylenically unsaturated monomer containing no fluorine and no hydrophilic group, the particles having an average particle diameter of 0.8 to 5.0 µm; and a transparent resin having a refractive index of 1.50 to 1.70.

According to a second aspect of the present invention, there is provided a composition for a light-scattering film, comprising: fluorine-containing resin fine particles each comprising a copolymer of 10 to 90% by weight of a first ethylenically unsaturated monomer containing fluorine with 89 to 5% by weight of a second ethylenically unsaturated monomer containing no fluorine and no hydrophilic group and 1 to 10% by weight of a third ethylenically unsaturated monomer containing a hydrophilic group, the particles having an average particle diameter of 0.8 to 5.0 µm; and a transparent resin having a refractive index of 1.50 to 1.70.

Further, according to the present invention, there is provided a light-scattering film prepared by using the composition for the light-scattering film of the present invention.

DETAILED DESCRIPTION OF THE INVENTION

A composition for the light-scattering film according to the present invention will now be described first.

A composition for the light-scattering film according to the present invention comprises fluorine-containing resin fine particles each comprising a specified amount of an ethylenically unsaturated monomer containing fluorine (first monomer) with a specified amount of other ethylenically unsaturated monomer component, and having an average particle diameter of 0.8 to 5.0 µm, as well as a transparent resin having a refractive index of 1.50 to 1.70.

According to a first aspect of the present invention, the other ethylenically unsaturated monomer component is provided by a second ethylenically unsaturated monomer that does not contain any of fluorine and a hydrophilic group (a second monomer). In this case, the fluorine-containing resin fine particles each comprise a copolymer having 10 to 60% by weight of the first monomer and 90 to 40% by weight of the second monomer.

According to a second aspect of the present invention, the other ethylenically unsaturated monomer component is provided by the second monomer noted above and an ethylenically unsaturated monomer having a hydrophilic group (third monomer). In this case, the fluorine-containing resin fine particles each comprise a copolymer having 10 to 90% by weight of the first monomer, 89 to 5% by weight of the second monomer, and 1 to 10% by weight of the third monomer.

The composition for a light-scattering film of the present invention makes it possible to form a light-scattering film excellent in the light scattering properties and in the surface smoothness.

Particularly, a composition for a light-scattering film according to the second aspect of the present invention permits producing, in addition to the effects noted above, an effect of forming a light-scattering film having the fluorine-containing resin fine particles dispersed therein more uniformly.

The refractive index of the fluorine-containing resin fine particles noted herein denotes the theoretical refractive index (nD) calculated by the equation given below:

$$nD = W1 \times n1 + W2 \times n2 + W3 \times n3$$

where:
n1: refractive index of a homopolymer of monomer A;
n2: refractive index of a homopolymer of monomer B;
n3: refractive index of a homopolymer of monomer C;
W1: copolymerization ratio of monomer A (weight ratio of the monomer A based on the total amount of the monomers);
W2: copolymerization ratio of monomer B (weight ratio of the monomer B based on the total amount of the monomers);
W3: copolymerization ratio of monomer C (weight ratio of the monomer C based on the total amount of the monomers).

The first monomer, a constitutional component of the copolymer of the invention, is a fluorine-containing ethylenically unsaturated monomer, which does not contain a hydrophilic group. Examples of the first monomer include, but not limited to, for example, fluorine-containing (meth) acrylates such as trifluoroethyl(meth)acrylate, tetrafluoropropyl(meth)acrylate, hexafluoropropyl(meth)acrylate, octafluoropentyl(meth)acrylate, and heptadecafluorodecyl (meth)acrylate.

The second monomer, a constitutional component of the copolymer of the invention, is an ethylenically unsaturated monomer that has no fluorine nor hydrophilic group. The second monomer includes a crosslinkable monomer and a non-crosslinkable monomer. It is desirable to use the crosslinkable monomer and the non-crosslinkable monomer in combination.

The crosslinkable monomer is a polyfunctional monomer, e.g., a bifunctional, trifunctional, or higher functional monomer, having a functional group imparting crosslinkability to the monomer. The crosslinkable monomer acts a crosslinking agent. At least one of the functional groups which the crosslinkable monomer has is required for the copolymerization with a non-crosslinkable monomer, and any of the other functional groups acts as the functional group for imparting the crosslinkability to the monomer.

The functional group serving to impart the crosslinkability to the monomer includes, but not limited to, for example, a vinyl-containing group, and an alkoxysilyl group.

The crosslinkage formed by these functional groups includes, for example, the crosslinkage formed by radical polymerization between vinyl-containing groups, and the crosslinkage formed by hydrolysis and condensation reaction of the alkoxysilyl group. Particularly, the crosslinkage formed by the radical polymerization of vinyl groups is preferable, because, in this case, the radical polymerization takes place in the synthesizing stage of the fluorine-containing resin fine particles.

It is desirable to use, as the crosslinkable monomer, a monomer having a plurality of functional groups differing from each other in reactivity, because, in this case, the agglomeration and an poly-dispersion of the resin fine particles are unlikely to take place in the polymerizing step, and the resultant resin fine particles exhibit a high resistance to heat. Specifically, a monomer having a polymerizable unsaturated carboxylic acid residue such as a (meth)acrylic acid residue, a crotonic acid residue, a maleic acid residue or a itaconic acid reside, together with a reactive functional group other than the polymerizable unsaturated carboxylic acid residues noted above. An ethylenically unsaturated monomer having a (meth)acrylic acid residue and a vinyl group is particularly preferable.

The reactive functional groups other than the polymerizable unsaturated carboxylic acid residue noted above include, for example, a vinyl-containing group, and an alkoxysilyl group.

The vinyl-containing group includes, for example, an unsaturated group-containing alkyl group having 1 to 11 carbon atoms such as ethenyl group, 1-propenyl group, allyl group, isopropenyl group, 1-butenyl group, 2-butenyl group or 2-pentenyl group; and an unsaturated group-containing aromatic group such as styryl group, or a cinnamyl group.

The alkoxysilyl group includes, for example, trimethoxysilyl group and triethoxysilyl group.

Of the crosslinkable monomers, the ethylenically unsaturated monomer having (meth)acrylic acid residue and a vinyl group noted above includes, but not limited to, for example, allyl(meth)acrylate, 1-methylallyl(meth)acrylate, 2-methylallyl(meth)acrylate, 1-butenyl(meth)acrylate, 2-butenyl(meth)acrylate, 3-butenyl(meth)acrylate, 1,3-methyl-3-butenyl(meth)acrylate, 2-chloroallyl(meth)acrylate, 3-chloroallyl(meth)acrylate, o-allylphenyl(meth)acrylate, 2-(allyloxy)ethyl(meth)acrylate, allyllactyl(meth)acrylate, citronellyl(meth)acrylate, geranyl(meth)acrylate, rhodinyl (meth)acrylate, cinnamyl(meth)acrylate, and vinyl(meth) acrylate.

Other crosslinkable monomers noted above include, but not limited to, for example, alkoxyl group-containing (meth) acrylic acid esters such as 2-methoxyethyl(meth)acrylate, and 2-ethoxyethyl(meth)acrylate; polyfunctional(meth) acrylic acid esters such as ethylene glycol di(meth)acrylate, triethylene glycol di(meth)acrylate, tetraethylene glycol di(meth)acrylate, trimethylolpropane tri(meth)acrylate, pentaerythritol tri(meth)acrylate, 1,1,1-trishydroxymethylethane diacrylate, 1,1,1-trishydroxymethylethane triacrylate, and 1,1,1-trishydroxymethylpropane triacrylic acid; alkoxysilyl group-containing monomers such as 3-methacryloxypropyl trimethoxy silane, 3-methacryloxypropyl triethoxy silane, 3-methacryloxypropyl triisopropoxy silane, 3-methacryloxypropyl methyl dimethoxy silane, 3-methacryloxypropyl methyl diethoxy silane, vinyl trimethoxy silane, vinyl triethoxy silane, and vinyl tris(2-methoxyethoxy)silane; divinyls such as divinyl benzene and divinyl adipate; and diallyls such as diallyl isophthalate, diallyl phthalate, diallyl maleate and dially itaconate.

As the crosslinkable monomer, ally(meth)acrylate or vinyl(meth)acrylate is particularly preferable.

A plurality of crosslinkable monomer compounds may be used in combination. It is desirable that the amount of the crosslinkable monomer in the copolymer is 5 to 20% by weight based on the total amount of the monomers.

The non-crosslinkable monomer noted above is a monomer that does not have a functional group serving to impart a crosslinkability to the monomer, and includes, but not limited to, for example, an (meth)acrylic acid ester such as methyl(meth)acrylate, ethyl (meth)acrylate, isopropyl(meth) acrylate, propyl(meth)acrylate, n-butyl(meth)acrylate, isobutyl (meth)acrylate, t-butyl(meth)acrylate, n-amyl (meth)acrylate, isoamyl(meth)acrylate, n-hexyl (meth)acrylate, 2-ethylhexyl(meth)acrylate, n-octyl(meth)acrylate, decyl(meth)acrylate, dodecyl(meth)acrylate, octadecyl (meth)acrylate, cyclohexyl(meth)acrylate, benzyl (meth) acrylate, isobonyl(meth)acrylate, or phenyl(meth)acrylate; and a styrene-based monomer such as styrene, vinyl toluene, α-methylstyrene, β-methylstyrene, o-methylstyrene, m-methylstyrene, p-methylstyrene, 1-butylstyrene or chlorostyrene. A plurality of non-crosslinkable monomers can be used in combination. Methyl(meth)acrylate is preferable as the non-crosslinkable monomer. It is desirable that the amount of the non-crosslinkable monomer is 20 to 85% by weight based on the total amount of the monomers.

As described previously, according to the first aspect of the present invention, the copolymer forming the fluorine-containing resin fine particles comprises the first monomer (fluorine-containing ethylenically unsaturated monomer) in an amount of 10 to 60% by weight and the second ethylenically unsaturated monomer in an amount of 90 to 40% by weight, based on the total amount of the ethylenically unsaturated monomers. If the amount of the first monomer is smaller than 10% by weight, the refractive index of the resultant the fluorine-containing resin fine particles is increased, leading to insufficient light scattering properties. On the other hand, if the amount of the first monomer exceed 60% by weight, it is impossible to obtain a light-scattering film excellent in surface smoothness.

It has been found, however, that, where the copolymer further includes 1 to 10% by weight of a third ethylenically unsaturated monomer having a hydrophilic group, it is possible to widen the content of the first monomer in the copolymer to fall within a range of 10 to 90% by weight. In this case, it is possible to more effectively prevent the fluorine-containing resin fine particles from unevenly distributing in the light-scattering film so as to obtain a light-scattering film having the fluorine-containing resin fine particles distributed therein more uniformly. In this case, the amount of the second monomer in the copolymer is 89% to 5% by weight.

The ethylenically unsaturated monomer having a hydrophilic group (third monomer) is a compound having a polar group performing a strong interaction with water. The third monomer can be dissolved in a polymerization solvent and is capable of copolymerization with the first ethylenically unsaturated monomer containing fluorine and with the second ethylenically unsaturated monomer. The hydrophilic group in the third monomer includes, but not limited to, for example, a hydroxyl group, a carboxyl group, an amido group, an amino group, a quaternary ammonium base group, a sulfonic acid group and an oxyethylene group.

The hydroxyl group-containing ethylenically unsaturated monomer noted above includes, for example, 2-hydroxyethyl(meth)acrylate, hydroxypropyl(meth)acrylate, 4-hydroxybutyl(meth)acrylate, glycerol(meth)acrylate, polyethylene glycol(meth)acrylate, polypropylene glycol(meth)acrylate, polyethylene glycol polypropylene glycol(meth)acrylate, 4-hydroxyvinylbenzene, 1-ethenyl-1-cyclohexanol, and allyl alcohol.

The carboxyl group-containing ethylenically unsaturated monomer noted above includes, for example, maleic acid, maleic anhydride, fumaric acid, itaconic acid, itaconic anhydride, citraconic acid or an alkyl or alkenyl monoester thereof, 2-(meth)acryloyloxyethyl maleic acid, 2-(meth)acryloyloxyethyl terephthalic acid, 2-(meth)acryloyloxyethyl phthalic acid, 2-(meth)acryloyloxyethyl hexahydrophthalic acid, 2-(meth)acryloyloxyethyl succinic acid, (meth)acrylic acid, crotonic acid, cinnamic acid, vinyl oleate, vinyl linolenate, and vinyl crotonate.

The amido group-containing ethylenically unsaturated monomer noted above includes, for example, monoalkylol (meth)acryl amide and dialkylol(meth)acryl amide. The monoalkylol(meth)acryl amide includes, for example, (meth)acrylamide, N-methylol(meth)acrylamide, N-methoxymethyl(meth)acrylamide, N-ethoxymethyl(meth)acrylamide, N-propoxymethyl(meth)acrylamide, N-butoxymethyl (meth)acrylamide, and N-pentoxymethyl(meth)acrylamide. On the other hand, the dialkylol(meth)acrylamide includes, for example, N,N-di(methylol)acrylamide, N-methylol-N-methoxymethyl(meth)acrylamide, N,N-di(methoxy methyl) acrylamide, N-ethoxymethyl-N-methoxymethylmethacrylamide, N,N-di(ethoxy methyl)acrylamide, N-ethoxymethyl-N-propoxymethacrylamide, N,N-di(propoxy methyl) acrylamide, N-butoxymethyl-N-(propoxymethyl) methacrylamide, N,N-di(butoxymethyl)acrylamide, N-butoxymethyl-N-(methoxymethyl)methacrylamide, N,N-di(pentoxymethyl)acrylamide, and N-methoxymethyl-N-(pentoxymethyl)methacrylamide.

The amino group-containing ethylenically unsaturated monomer noted above includes, for example, dimethylaminoethyl(meth)acrylate, diethylaminoethyl(meth)acrylate, methylethylaminoethyl(meth)acrylate, dimethylaminostyrene and diethylaminostyrene.

The quaternary ammonium base group-containing ethylenically unsaturated monomer noted above includes, for example, a monomer formed by quaternarizing a dialkylamino group-containing ethylenically unsaturated monomer and having a counter ion including halogen ion such as Cl$^-$, Br$^-$ or I$^-$ or QSO3-(where Q is an alkyl group having 1 to 12 carbon atoms). Such a monomer includes dimethylaminoethylmethyl(meth)acrylate chloride, trimethyl-3-(1-(meth)acrylamido-1,1-dimethylpropyl)ammonium chloride, trimethyl-3-(1-(meth)acrylamidopropyl)ammonium chloride, and trimethyl-3-(1-(meth)acrylamido-1,1-dimethylethyl)ammonium chloride.

The sulfonic acid group-containing ethylenically unsaturated monomer noted above includes, for example, vinylsulfonic acid, allylsulfonic acid, methallylsulfonic acid, 2-sulfoethyl(meth)acrylate, 2-sulfobutyl(meth)acrylate, styrenesulfonic acid, sulfophenyl allyl ether, sulfophenyl methallyl ether, and 2-acrylamido-2-methylpropanesulfonic acid.

Further, the oxyethylene group-containing ethylenically unsaturated monomer noted above includes, for example, methoxy polyethylene glycol(meth)acrylate, methoxy polypropylene glycol(meth)acrylate, phenoxy polyethylene glycol(meth)acrylate, and an adduct of nonylphenol(meth) acrylate with polyethylene oxide.

A plurality of hydrophilic group-containing ethylenically unsaturated monomers can be used in combination.

Among the hydrophilic group-containing ethylenically unsaturated monomers, it is desirable to use the hydroxyl group-containing ethylenically unsaturated monomers, which are relatively lipophilic, such as polyethylene glycol (meth)acrylate, polypropylene glycol(meth)acrylate, and polyethylene glycol polypropylene glycol(meth)acrylate, or the carboxyl group-containing ethylenically unsaturated monomers such as 2-(meth)acryloyloxyethylphthalic acid, and 2-(meth)acryloyloxyethylhexahydrophthalic acid.

The hydrophilic group-containing ethylenically unsaturated monomer in an amount of 1 to 10% by weight based on the total amount of the monomers is subjected to the copolymerization with the first ethylenically unsaturated monomer containing fluorine and the second ethylenically unsaturated monomer. If the copolymerization ratio of the hydrophilic group-containing ethylenically unsaturated monomer is lower than 1% by weight, it is impossible to suppress uneven distribution of the fluorine-containing resin fine particles in the light-scattering film, the uneven distribution being caused by the water-repelling and oil-repelling properties exhibited by the fluorine radical. On the other hand, if the amount of the hydrophilic group-containing ethylenically unsaturated monomer exceeds 10% by weight, the particle formation does not take place smoothly, and the fluorine-containing resin fine particles tend to be gelled.

The copolymer constituting the fluorine-containing resin fine particles of the present invention can be obtained by copolymerization of the first monomer with the second monomer, or copolymerization of the first monomer with the second monomer and the third monomer. In general, the copolymerization is carried out in a solvent in the presence of a polymerization initiator.

The solvent used for carrying out the copolymerization of the first ethylenically unsaturated monomer containing fluorine with the other ethylenically unsaturated monomer component (i.e., the second monomer or the combination of the second monomer and the third monomer) is selected from those solvents in which the monomers are homogeneously dissolved, and in which the fluorine-containing resin fine particles obtained by copolymerizing the monomers are insoluble. Such solvents include, for example, alcohols such as methanol, ethanol, n-propanol, isopropanol, n-butanol and t-butanol; ethers such as diethyl ether, isopropyl ether, butyl ether, methyl cellosolve and tetrahydrofuran; ketones such as acetone, methyl ethyl ketone and diethyl ketone; and a mixed solvent of the solvent exemplified above and water. A plurality of these solvents can be used in combination. Particularly, it is desirable to use methanol, ethanol or a mixed solvent consisting of methanol or ethanol and water. It is desirable for the mixed solvent to contain 0 to 70% by weight of water.

The copolymerization of the monomers noted above is preferably carried out at a concentration of the monomers in total of 10 to 30% by weight based on the solvent used.

It is possible to use a polymerization initiator represented by general formula (1) given below or a polymerization initiator represented by general formula (2) given below. These polymerization initiators are cationic water-soluble azo polymerization initiators. By using these polymerization initiators, it is possible to make cationic the molecular terminal of the resultant fluorine-containing resin forming the fine particles.

It is desirable to use the polymerization initiator represented by general formula (1) or (2) given below in an amount of 0.01 to 0.30% by weight based on the total amount of the monomers.

Formula (1):

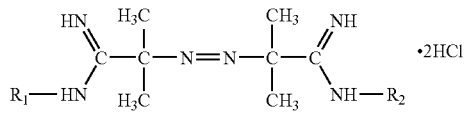

where $R_1$ and $R_2$ independently denote a hydrogen atom, an alkyl group or an aromatic group. The alkyl group includes, for example, a methyl group, an ethyl group and a propyl group. The aromatic group includes, for example, a phenyl group or a benzyl group. The alkyl group and the aromatic group may be hydroxylated or halogenated. The hydroxylated alkyl group includes, for example, a hydroxymethyl group, a hydroxyethyl group and a hydroxypropyl group. The hydroxylated aromatic group includes, for example, a hydroxyphenyl group and a hydroxybenzyl group. The halogenated aromatic group includes, for example, a chlorophenyl group and a chlorobenzyl group.

The polymerization initiators represented by general formula (1) include, for example, 2,2'-azobis[2-(phenylamidino)propane]dihydrochloride [VA-545 manufactured by Wako Junyaku K.K.], 2,2'-azobis{2-[N-(4-chlorophenyl)amidino]propane}dihydrochloride (VA-546 manufactured by Wako Junyaku K.K.), 2,2'-azobis{2-[N-(4-hydroxyphenyl)amidino]propane}dihydrocloride (VA-548 manufactured by Wako Junyaku K.K.), 2,2'-azobis[2-(N-benzylamidino)propane]dihydrochloride (VA-552 manufactured by Wako Junyaku K.K.), 2,2'-azobis[2-(N-allylamidino)propane]dihydrochloride (VA-553 manufactured by Wako Junyaku K.K.), 2,2'-azobis(2-amidinopropane)dihydrochloride (VA-50 manufactured by Wako Junyaku K.K.), and 2,2'-azobis{2-[N-(4-hydroxyethyl)amidino]propane}dihydrochloride (VA-558 manufactured by Wako Junyaku K.K.).

Formula (2):

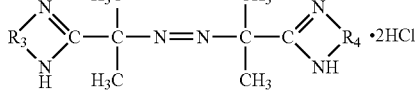

where $R_3$ and $R_4$ independently denote an alkylene group or a divalent aromatic group. The alkylene group includes, for example, a methylene group, an ethylene group and a propylene group. The divalent aromatic group includes, for example, a phenylene group and a biphenylene group. The alkylene group may be hydroxylated. The hydroxylated alkylene group includes, for example, a hydroxymethylene group and a hydroxyethylene group.

The polymerization initiators represented by general formula (2) include, for example, 2,2-azobis[2-(5-methyl-2-imidazolin-2-yl)propane]dihydrochloride (VA-041 manufactured by Wako Junyaku K.K.), 2,2-azobis[2-(2-imidazolin-2-yl)propane]dihydrochloride (VA-044 manufactured by Wako Junyaku K.K.), 2,2-azobis[2-(4,5,6,7-tetrahydro-1H-1,3-diazepin-2-yl)propane]dihydrochloride (VA-054 manufactured by Wako Junyaku K.K.), 2,2-azobis[2-(3,4,5,6-tetrahydropyrimidin-2-yl)propane]dihydrochloride (VA-058 manufactured by Wako Junyaku K.K.), 2,2-azobis[2-(5-hydroxy-3,4,5,6-tetrahydropyrimidin-2-yl)propane]dihydrochloride (VA-059 manufactured by Wako Junyaku K.K.), 2,2-azobis{2-[1-(2-hydroxyethyl)-2-imidazolin-2-yl)propane]dihydrochloride (VA-060 manufactured by Wako Junyaku K.K.), and 2,2-azobis[2-(2-imidazolin-2-yl)propane] (VA-061 manufactured by Wako Junyaku K.K.).

In carrying out the copolymerization of the first ethylenically unsaturated monomer containing fluorine with the other ethylenically unsaturated monomer component, it is desirable to use a nonionic polymerization initiator together with the cationic water-soluble azo polymerization initiator represented by general formula (1) or (2) given above, in order to control the particle diameter of the fluorine-containing resin fine particles obtained. In the case of using the nonionic polymerization initiator together with the cationic water-soluble azo polymerization initiator, it is possible to increase the particle diameter of the fluorine-containing resin fine particles to 5.0 μm, though the particle diameter of the fluorine-containing resin fine particles is 0.1 and 1.2 µm in the case of using the cationic water-soluble azo polymerization initiator alone.

The nonionic polymerization initiator is provided by a compound, which can be dissolved in the polymerization solvent, which generates radicals upon heating, and which does not make ionic the molecular terminal of the resultant polymer. The nonionic polymerization initiators includes, for example, nonionic azo polymerization initiators such as an azonitrile compound, an alkylazo compound, and an azoamide compound; and organic peroxides such as ketone peroxides, peroxy ketals, hydroperoxides, dialkyl peroxides, diacyl peroxides, peroxy dicarbonates, and peroxy esters.

The azonitrile compounds noted above include, for example, 2,2-azobis(4-methoxy-2,4-dimethylvaleronitrile) (V-70 manufactured by Wako Junyaku K.K.), 2,2'-azobis(2,4-dimethylvaleronitrile) (V-65 manufactured by Wako Junyaku K.K.), 2,2'-azobisisobutyronitrile (V-60 manufactured by Wako Junyaku K.K.), 2,2'-azobis(2-methylbutyronitrile) (V-59 manufactured by Wako Junyaku K.K.), 1,1'-azobis (cyclohexane-1-carbonitrile) (V-40 manufactured by Wako Junyaku K.K.), 1-[(1-cyano-1-methylethyl)azo]formamide (V-30 manufactured by Wako Junyaku K.K.), and 2-phenylazo-4-methoxy-2,4-dimethyl-valeronitrile (V-19 manufactured by Wako Junyaku K.K.).

The alkylazo compounds noted above include, for example, 2,2'-azobis(2,4,4-trimethylpentane) (VR-110 manufactured by Wako Junyaku K.K.), and 2,2'-azobis(2-methylpropane) (VR-160 manufactured by Wako Junyaku K.K.).

The azoamide compounds noted above include, for example, 2,2'-azobis[2-methyl-N-[1,1-bis(hydroxymethyl)-2-hydroxyethyl]propionamide (VA-080 manufactured by Wako Junyaku K.K.), 2,2'-azobis[2-methyl-N-[1,1-bis(hydroxymethyl)ethyl]propionamide] (VA-082 manufactured by Wako Junyaku K.K.), 2,2'-azobis[2-methyl-N-[2-(1-hydroxybutyl)-propionamide] (VA-085 manufactured by Wako Junyaku K.K.), 2,2'-azobis[2-methyl-N-(2-hydroxyethyl)-propionamide] (VA-086 manufactured by Wako Junyaku K.K.), 2,2'-azobis(2-methylpropionamide)dihydrate (VA-088 manufactured by Wako Junyaku K.K.), 2,2'-azobis[N-(2-propenyl)-2-methylpropionamide (VF-096 manufactured by Wako Junyaku K.K.), 2,2'-azobis(N-butyl-2-methylpropionamide) (Vam-110 manufactured by Wako Junyaku K.K.), and 2,2'-azobis(N-cyclohexyl-2-methylpropionamide (Vam-111 manufactured by Wako Junyaku K.K.).

The ketone peroxides noted above include, for example, methyl ethyl ketone peroxide (Permec H manufactured by Nippon Fat and Oil Co., Ltd.), cyclohexanone peroxide (Perhexa H manufactured by Nippon Fat and Oil Co., Ltd.), methylcyclohexanone peroxide (Perhexa Q manufactured by Nippon Fat and Oil Co., Ltd.), methyl acetoacetate peroxide (Percure SA manufactured by Nippon Fat and Oil Co., Ltd.), and acetylacetone peroxide (Percure A manufactured by Nippon Fat and Oil Co., Ltd.).

The peroxy ketals noted above include, for example, 1,1-bis(t-hexylperoxy) 3,3,5-trimethylcyclohexane (Perhexa TMH manufactured by Nippon Fat and Oil Co., Ltd.), 1,1-bis(t-hexylperoxy)cyclohexane (Perhexa HC manufactured by Nippon Fat and Oil Co., Ltd.), 1,1-bis(t-butylperoxy) 3,3,5-trimethylcyclohexane (Perhexa 3M manufactured by Nippon Fat and Oil Co., Ltd.), 1,1-bis(t-butylperoxy)cyclohexane (Perhexa C manufactured by Nippon Fat and Oil Co., Ltd.), 1,1-bis(t-butylperoxy)cyclododecane (Perhexa CD manufactured by Nippon Fat and Oil Co., Ltd.), 2,2-bis(t-butylperoxy)butane (Perhexa 22 manufactured by Nippon Fat and Oil Co., Ltd.), n-butyl 4,4-bis(t-butylperoxy)valerate (Perhexa V manufactured by Nippon Fat and Oil Co., Ltd.), and 2,2-bis(4,4-di-t-butylperoxycyclohexyl)propane (Pertetra A manufactured by Nippon Fat and Oil Co., Ltd.).

The hydroperoxides noted above include, for example, t-butyl hydroperoxide (Perbutyl H-69 manufactured by Nippon Fat and Oil Co., Ltd.), p-menthane hydroperoxide (Permentha H manufactured by Nippon Fat and Oil Co., Ltd.), diisopropylbenzene hydroperoxide (Percumyl P manufactured by Nippon Fat and Oil Co., Ltd.), 1,1,3,3-tetramethylbutyl hydroperoxide (Perocta H manufactured by Nippon Fat and Oil Co., Ltd.), cumene hydroperoxide (Percumyl H-80 manufactured by Nippon Fat and Oil Co., Ltd.), and t-hexyl hydroperoxide (Perhexyl H manufactured by Nippon Fat and Oil Co., Ltd.).

The dialkyl peroxides noted above include, for example, 2,5-dimethyl-2,5-bis(t-butylperoxy)hexyne-3 (Perhexyne 25B manufactured by Nippon Fat and Oil Co., Ltd.), di-t-butyl peroxide (Perbutyl D manufactured by Nippon Fat and Oil Co., Ltd.), t-butylcumyl peroxide (Perbutyl C manufactured by Nippon Fat and Oil Co., Ltd.), 2,5-dimethyl-2,5-bis(t-butylperoxy)hexane (Perhexa 25B manufactured by Nippon Fat and Oil Co., Ltd.), dicumyl peroxide (Percumyl D manufactured by Nippon Fat and Oil Co., Ltd.), and α,α'-bis(t-butylperoxy)diisopropylbenzene (Perbutyl P manufactured by Nippon Fat and Oil Co., Ltd.).

The diacyl peroxides noted above include, for example, octanoyl peroxide (Perroyl O manufactured by Nippon Fat and Oil Co., Ltd.), lauroyl peroxide (Perroyl L manufactured by Nippon Fat and Oil Co., Ltd.), stearoyl peroxide (Perroyl S manufactured by Nippon Fat and Oil Co., Ltd.), succinic acid peroxide (Perroyl S A manufactured by Nippon Fat and Oil Co., Ltd.), benzoyl peroxide (Niper B W manufactured by Nippon Fat and Oil Co., Ltd.), isobutylyl peroxide (Perroyl I B manufactured by Nippon Fat and Oil Co., Ltd.), 2,4-dichlorobenzoyl peroxide (Niper C S manufactured by Nippon Fat and Oil Co., Ltd.), and 3,5,5-trimethylhexanoyl peroxide (Perroyl 355 manufactured by Nippon Fat and Oil Co., Ltd.).

The peroxy dicarbonates noted above include, for example, di-n-propyl peroxydicarbonate (Perroyl NPP-50M manufactured by Nippon Fat and Oil Co., Ltd.), diisopropyl peroxydicarbonate (Perroyl IPP-50 manufactured by Nippon Fat and Oil Co., Ltd.), bis(4-t-butylcyclohexyl)peroxydicarbonate (Perroyl TCP manufactured by Nippon Fat and Oil Co., Ltd.), di-2-ethoxyethyl peroxydicarbonate (Perroyl EEP manufactured by Nippon Fat and Oil Co., Ltd.), di-2-ethoxyhexyl peroxydicarbonate (Perroyl OPP manufactured by Nippon Fat and Oil Co., Ltd.), di-2-methoxybutyl peroxydicarbonate (Perroyl MBP manufactured by Nippon Fat and Oil Co., Ltd.), and di-(3-methyl-3-methoxybutyl)peroxydicarbonate (Perroyl SOP manufactured by Nippon Fat and Oil Co., Ltd.).

Further, the peroxy esters noted above include, for example, α,α'-bis (neodecanoylperoxy)diisopropyl-benzene (Diper ND manufactured by Nippon Fat and Oil Co., Ltd.), cumyl peroxyneododecanoate (Percumyl ND manufactured by Nippon Fat and Oil Co., Ltd.) 1,1,3,3-tetramethylbutyl peroxyneodecanoate (Perocta ND manufactured by Nippon Fat and Oil Co., Ltd.), 1-cyclohexyl-1-methylethyl peroxyneodecanoate (Percyclo ND manufactured by Nippon Fat and Oil Co., Ltd.), t-hexyl peroxyneodecanoate (Perhexyl ND manufactured by Nippon Fat and Oil Co., Ltd.), t-butyl peroxyneodecanoate (Perbutyl ND manufactured by Nippon Fat and Oil Co., Ltd.), t-hexyl peroxypivalate (Perhexyl PV manufactured by Nippon Fat and Oil Co., Ltd.), t-butyl peroxypivalate (Perbutyl PV manufactured by Nippon Fat and Oil Co., Ltd.), 1,1,3,3-tetramethyl butyl peroxy-2-ethylhexanoate (Perocta O manufactured by Nippon Fat and Oil Co., Ltd.), 2,5-dimethyl-2,5-bis(2-ethylhexanoylperoxy)hexane (Perhexa 250 manufactured by Nippon Fat and Oil Co., Ltd.), 1-cyclohexyl-1-methylethyl peroxy-2-ethylhexanoate (Percyclo O manufactured by Nippon Fat and Oil Co., Ltd.), t-hexyl peroxy-2-ethyl hexanoate (Perhexyl O manufactured by Nippon Fat and Oil Co., Ltd.), t-butyl peroxy-2-ethylhexanoate (Perbutyl O manufactured by Nippon Fat and Oil Co., Ltd.), t-butyl peroxyisobutyrate (Perbutyl IB manufactured by Nippon Fat and Oil Co., Ltd.), t-hexyl peroxyisopropylmonocarbonate (Perhexyl I manufactured by Nippon Fat and Oil Co., Ltd.), t-butylperoxymaleic acid (Perbutyl MA manufactured by Nippon Fat and Oil Co., Ltd.), t-butyl peroxy-3,5,5-trimethylhexanoate (Perbutyl 355 manufactured by Nippon Fat and Oil Co., Ltd.), t-butyl peroxylaurate (Perbutyl L manufactured by Nippon Fat and Oil Co., Ltd.), 2,5-dimethyl 2,5-bis(m-toluoylperoxy)hexane (Perhexa 25 MT manufactured by Nippon Fat and Oil Co., Ltd.), t-butyl peroxyisopropylmonocarbonate (Perbutyl I manufactured by Nippon Fat and Oil Co., Ltd.), t-butyl peoxy-2-ethylhexylmonocarbonate (Perbutyl E manufactured by Nippon Fat and Oil Co., Ltd.), t-hexyl peroxybenzoate (Perhexyl Z manufactured by Nippon Fat and Oil Co., Ltd.), 2,5-dimethyl-2,5-bis(benzoylperoxy) hexane (Perhexa 25Z manufactured by Nippon Fat and Oil Co., Ltd.), t-butyl peroxyacetate (Perbutyl A manufactured by Nippon Fat and Oil Co., Ltd.), t-butyl peroxy-m-toluoylbenzoate (Perbutyl ZT manufactured by Nippon Fat and Oil Co., Ltd.), t-butyl peroxybenzoate (Perbutyl Z manufactured by Nippon Fat and Oil Co., Ltd.), and bis(t-butylperoxy) isophthalate (Perbutyl IF manufactured by Nippon Fat and Oil Co., Ltd.).

The organic peroxides other than those exemplified above include, for example, t-butyl peroxyallylmonocarbonate (Peromer AC manufactured by Nippon Fat and Oil Co., Ltd.), t-butyltrimethylsilyl peroxide (Perbutyl SM manufactured by Nippon Fat and Oil Co., Ltd.), 3,3',4,4'-tetra(t-butylperoxycarbonyl)-benzophenone (BTTB-50 manufactured by Nippon Fat and Oil Co., Ltd.), and 2,3-dimethyl-2,3-diphenylbutane (Nofmer BC manufactured by Nippon Fat and Oil Co., Ltd.).

Particularly, in the case of using a nonionic radical polymerization initiator having a low 10 hour half-life temperature, it is possible to increase effectively the particle diameter of the fine particles of the fluorine-containing resin by using a small amount of the polymerization initiator.

The nonionic polymerization initiator may be used in an amount of 0.01 to 10.0% by weight based on the total amount of the monomers. It is desirable to add the nonionic polymerization initiator simultaneously with the cationic water-soluble azo polymerization initiator.

The fluorine-containing resin fine particles can be synthesized by, for example, uniformly dissolving the first ethylenically unsaturated monomer containing fluorine and the other ethylenically unsaturated monomer component in the solvent noted above to prepare a reaction solution, followed by removing the dissolved oxygen from the reaction solution and subsequently heating the reaction solution to 60° C. Further, a solution of the cationic water-soluble azo polymerization initiator in ion-exchanged water is added to the reaction solution, simultaneously with the nonionic polymerization initiator as required. Then, the reaction solution is stirred under heating for 3 to 10 hours so as to obtain the fluorine-containing resin fine particles.

Alternatively, the other ethylenically unsaturated monomer component is uniformly dissolved in the solvent, followed by removing the oxygen dissolved in the resultant solution of the monomer component and subsequently heating the solution to 60° C. Then, a solution of the cationic water-soluble azo polymerization initiator in ion-exchanged water is added to the solution of the monomer component, simultaneously with the nonionic polymerization initiator as required. Then, the reaction solution is stirred under heating for 3 to 10 hours so as to obtain a dispersion of fine particles. Finally, the fluorine-containing ethylenically unsaturated monomer and the remaining other ethylenically unsaturated monomer are dissolved in the dispersion, followed by adding the nonionic polymerization initiator to the resultant solution and stirring the solution under heating for 3 to 10 hours so as to synthesize the desired fine particles of the fluorine-containing resin.

Where the conversion rate after the polymerization is not sufficient, a polymerization initiator in an amount of 0.1 to 2% by weight based on the total amount of the monomers is added after completion of the polymerization. An ordinary oil-soluble radical polymerization initiator can be used satisfactorily as the polymerization initiator that is added after completion of the polymerization. Examples of such a polymerization initiator include, for example, azo nitrile compounds such as 2,2-azobis(4-methoxy-2,4-dimethylvaleronitrile) (V-70 manufactured by Wako Junyaku K.K.), 2,2-azobis(2,4-dimethylvaleronitrile) (V-65 manufactured by Wako Junyaku K.K.), 2,2'-azobisisobutyronitrile (V-60 manufactured by Wako Junyaku K.K.), and 2,2'-azobis(2-methylbutyronitrile) (V-59 manufactured by Wako Junyaku K.K.); organic peroxide compounds, for example, diacyl peroxides such as octanoyl peroxide (Perroyl O manufactured by Nippon Fat and Oil Co., Ltd.), lauroyl peroxide (Perroyl L manufactured by Nippon Fat and Oil Co., Ltd.), stearoyl peroxide (Perroyl S manufactured by Nippon Fat and Oil Co., Ltd.), succinic acid peroxide (Perroyl SA manufactured by Nippon Fat and Oil Co., Ltd.), benzoyl peroxide (Niper BW manufactured by Nippon Fat and Oil Co., Ltd.), isobutyryl peroxide (Perroyl IB manufactured by Nippon Fat and Oil Co., Ltd.), 2,4-dichlorobenzoyl peroxide (Niper CS manufactured by Nippon Fat and Oil Co., Ltd.), and 3,5,5-trimethylhexanoyl peroxide (Perroyl 355 manufactured by Nippon Fat and Oil Co., Ltd.); peroxy dicarbonates such as di-n-propyl peroxydicarbonate (Perroyl NPP-50M manufactured by Nippon Fat and Oil Co., Ltd.), diisopropyl peroxydicarbonate (Perroyl IPP-50 manufactured by Nippon Fat and Oil Co., Ltd.), bis(4-t-butylcyclohexyl)peroxydicarbonate (Perroyl TCP manufactured by Nippon Fat and Oil Co., Ltd.), di-2-ethoxyethyl peroxydicarbonate (Perroyl EEP manufactured by Nippon Fat and Oil Co., Ltd.), di-2-ethoxyhexyl peroxydicarbonate (Perroyl OPP manufactured by Nippon Fat and Oil Co., Ltd.), di-2-methoxybutyl peroxydicarbonate (Perroyl MBP manufactured by Nippon Fat and Oil Co., Ltd.), and di(3-methyl-3-methoxybutyl)peroxydicarbonate (Perroyl SOP manufactured by Nippon Fat and Oil Co., Ltd.); hydroxy peroxides such as t-butyl hydroperoxide (Perbutyl H-69 manufactured by Nippon Fat and Oil Co., Ltd.), and 1,1,3,3-tetramethylbutyl hydroperoxide (Perocta H manufactured by Nippon Fat and Oil Co., Ltd.); dialkyl peroxides such as di-t-butyl peroxide (Perbutyl D manufactured by Nippon Fat and Oil Co., Ltd.), and 2,5-dimethyl-2,5-bis(t-butylperoxy) hexane (Perhexa 25B manufactured by Nippon Fat and Oil Co., Ltd.); and peroxy esters such as α,α'-bis (neodecanoylperoxy)diisopropyl-benzene (Diper ND manufactured by Nippon Fat and Oil Co., Ltd.), cumyl peroxynedodecanoate (Percumyl ND manufactured by Nippon Fat and Oil Co., Ltd.) 1,1,3,3-tetramethylbutyl peroxyneodecanoate (Perocta ND manufactured by Nippon Fat and Oil Co., Ltd.), 1-cyclohexyl-1-methylethyl peroxyneodecanoate (Percyclo ND manufactured by Nippon Fat and Oil Co., Ltd.), t-hexyl peroxyneodecanoate (Perhexyl ND manufactured by Nippon Fat and Oil Co., Ltd.), t-butyl peroxyneodecanoate (Perbutyl ND manufactured by Nippon Fat and Oil Co., Ltd.), t-hexyl peroxypivalate (Perhexyl PV manufactured by Nippon Fat and Oil Co., Ltd.), t-butyl peroxypivalate (Perbutyl PV manufactured by Nippon Fat and Oil Co., Ltd.), 1,1,3,3-tetramethylbutyl peroxy-2-ethylhexanoate (Perocta O manufactured by Nippon Fat and Oil Co., Ltd.), 2,5-dimethyl-2,5-bis(2-ethylhexanoylperoxy)hexane (Perhexa 250 manufactured by Nippon Fat and Oil Co., Ltd.), 1-cyclohexyl-1-methylethyl peroxy-2-ethylhexanoate (Percyclo O manufactured by Nippon Fat and Oil Co., Ltd.), t-hexyl peroxy-2-ethylhexanoate (Perhexyl O manufactured by Nippon Fat and Oil Co., Ltd.), t-butyl peroxy-2-ethylhexanoate (Perbutyl O manufactured by Nippon Fat and Oil Co., Ltd.), t-butyl peroxyisobutyrate (Perbutyl IB manufactured by Nippon Fat and Oil Co., Ltd.), t-hexyl peroxyisopropylmonocarbonate (Perhexyl I manufactured by Nippon Fat and Oil Co., Ltd.), and t-butyl peroxymaleic acid (Perbutyl MA manufactured by Nippon Fat and Oil Co., Ltd.).

It is possible to use a dispersion stabilizer and a surfactant in carrying out the copolymerization of the fluorine-containing ethylenically unsaturated monomer and the other ethylenically unsaturated monomer component. The dispersion stabilizer includes, for example, polyvinyl alcohol and polyvinyl pyrrolidone, which serve to improve the compatibility with, for example, polyvinyl chloride and a styrene-acryl copolymer. The surfactant includes, but not limited to, for example, nonionic surfactants that permit improving the compatibility with polypropylene such as a polyoxy ethylene polyoxy propylene block copolymer ("Epan" manufactured by Daiichi Kogyo Seiyaku K.K.) and a polyether-modified silicone resin ("Silhouette" manufactured by Nippon Unicar K.K.); cationic surfactants such as a quaternary ammonium salt preventing charging ("Coatamin" manufactured by Kao K.K.); and amphoteric surfactants such as a betaine alkyl dimethylaminoacetate ("Amorgen" manufactured by Daiichi Kogyo Seiyaku K.K.). It is possible to add the dispersion stabilizer and the surfactant during or after the polymerization. The dispersion stabilizer can be added in an amount of 0.1 to 10% by weight based on the total amount of the monomers. The surfactant can be added in an amount of 0.1 to 10% by weight based on the total amount of the monomers.

The average particle diameter of the fluorine-containing resin fine particles should be controlled to fall within a range of 0.8 to 5.0 µm, preferably 1.3 to 2.7 µm, by controlling the composition of the monomers, the amount of water contained in the polymerization solvent, and the amount of the nonionic polymerization initiator. Where the average particle diameter of the fluorine-containing resin fine particles is smaller than 0.8 µm, the light scattering capability of the resin fine particles is lowered. On the other hand, where the average particle diameter exceeds 5.0 µm, the surface smoothness of the resin fine particles is impaired.

The refractive index of the fluorine-containing resin fine particles of the present invention is smaller than 1.5, preferably 1.36 to 1.49.

When synthesized by using a crosslinkable monomer together with a non-crosslinkable monomer as the second ethylenically unsaturated monomer, the fluorine-containing resin fine particles are in the form of crosslinked fine particles excellent in the heat resistance and in the solvent resistance. Therefore, it is possible to disperse the particular fine particles of the fluorine-containing resin in an optional solvent that does not dissolve the particular fine particles by employing the step of, for example, the stripping. In the case of employing the particular method, it is unnecessary to employ the drying step. It follows that the fluorine-containing resin fine particles are not agglomerated to each other so as to make it possible to obtain a composition for the light-scattering film in which the fluorine-containing resin fine particles are dispersed in the form of the primary particles.

The fluorine-containing resin fine particles obtained by the copolymerization of the first monomer containing fluorine with the other ethylenically unsaturated monomer component in the solvent in the presence of the polymerization initiator represented by formula (1) or formula (2) given previously are obtained in the form of monodisperse fine particles having a particle size distribution such that the variation coefficient of the particle diameter of the resin fine particles is not larger than 5%. The variation coefficient of the particle diameter can be obtained by actually measuring the diameters of the fine particles under observation with an optical microscope, dividing the standard deviation by the average value of the particle diameters measured.

Moire (interference fringe) is generated in the light-scattering film formed by using the composition for the light-scattering film solely containing fine particles having a small variation coefficient. Therefore, it is desirable that the light-scattering film contains 2 or more kinds of fluorine-containing resin fine particles differing from each other in the average particle diameter such that the variation coefficient of the particle diameter of all the fluorine-containing resin fine particles including the plural kinds of the fluorine-containing resin fine particles to fall within a range of 2.0 and 20.0%. If the variation coefficient of the particle diameter of all the fluorine-containing resin fine particles is smaller than 2.0%, moire tends to be generated in the light-scattering film. On the other hand, if the variation coefficient of the particle diameter exceeds 20.0%, the light-scattering film is rendered poor in its surface smoothness. The variation coefficient of the particle diameter of the entire fluorine-containing resin fine particles is more preferably 6.0 to 20.0%.

In order to prevent the moire generation in the light-scattering film, the composition for the light-scattering film of the present invention may contain, in addition to the fluorine-containing resin fine particles, other fine particles having a refractive index of 1.30 or more, but less than 1.50 and also having an average particle diameter of 0.8 to 5.0 µm such that the variation coefficient of the particle diameter of all the fine particles including the fluorine-containing resin fine particles and the other fine particles is allowed to fall within a range of 2.0 to 20.0%.

The other fine particles having a low refractive index of 1.30 or more, but less than 1.50 include, but not limited to, for example, resin fine particles such as fine particles of fluorine resin (refractive index of 1.35), fine particles of silicone resin (refractive index of 1.45), fine particles of vinyl chloride resin (refractive index of 1.45), fine particles of vinyl acetate resin (refractive index of 1.46), fine particles of polypropylene resin (refractive index of 1.49), and fine particles of cellulose acetate propionate (refractive index of 1.47); and inorganic fine particles such as fine particles of holosilicate (refractive index of about 1.43). The fine particles having a low refractive index are used in the present invention in an amount of 1 to 300 parts by weight based on 100 parts by weight of the transparent resin.

The transparent resin contained in the composition for the light-scattering film of the present invention is a transparent resin having a high refractive index of 1.50 to 1.70. The light scattering capability of the light-scattering film is improved with increase in the difference in the refractive index between the transparent resin and the fine particles dispersed in the transparent resin. Since the fluorine-containing resin fine particles used in the present invention are fine particles having a low refractive index of less than 1.50, a transparent resin having a high refractive index of 1.50 to 1.70 is used in the composition for the light-scattering film of the present invention.

The transparent resin having a high refractive index includes, but not limited to, for example, an acrylic resin (refractive index of 1.50 to 1.55), a fluorene resin (refractive index of about 1.6), a phenolic resin (refractive index of about 1.7), cellulose (refractive index of about 1.54), a urea resin (refractive index of about 1.57), a polyvinyl acetate (refractive index of about 1.54), a polyvinyl chloride (refractive index of about 1.53), a polyether ether ketone (refractive index of about 1.68), a polyethylene terephthalate (refractive index of about 1.67), a polystyrene (refractive index of about 1.59), a polycarbonate (refractive index of about 1.58), a polyamide (refractive index of about 1.53), and a polyarylate (refractive index of about 1.60).

It is desirable to use the fluorine-containing resin fine particles in an amount of 1 to 300 parts by weight based on 100 parts by weight of the transparent resin. If the amount of the fluorine-containing resin fine particles is larger than 300 parts by weight, the distance between the adjacent resin fine particles is diminished. It follows that it is difficult to maintain a stable dispersion state and, thus, the resin fine particles tend to be agglomerated. It is more desirable that the amount of the fluorine-containing resin fine particles is 5 to 100 parts by weight based on 100 parts by weight of the transparent resin.

Where the composition for the light-scattering film is cured by irradiation with an active energy beam for forming the light-scattering film or where the light-scattering film is formed by the patterning by means of the lithography method, the composition for the light-scattering film contains an ethylenically unsaturated compound. Further, where the composition is cured by irradiation with an ultraviolet light, the composition contains a photopolymerization initiator.

Also, where the composition for the light-scattering film is subjected to an alkali development in the patterning step by the lithography method, it is desirable to use, as the transparent resin having a high refractive index of 1.50 to 1.70, those resins soluble in alkali, such as a fluorene resin or an acrylic resin having a carboxyl group.

The ethylenically unsaturated compound noted above is a compound having one or more ethylenically unsaturated double bonds. It is possible to use a monomer, an oligomer and a photosensitive resin as the ethylenically unsaturated compound. The monomers include, for example, 2-hydroxyethyl(meth)acrylate, 2-hydroxypropyl(meth)acrylate, cyclohexyl(meth)acrylate, polyethylene glycol di(meth)acrylate, trimethylolpropane tri(meth)acrylate, pentaerythritol tri(meth)acrylate, dipentaerythritol hexa(meth)acrylate, and dipentaerythritol penta(meth)acrylate. The oligomers include, for example, epoxy(meth)acrylate, urethane(meth) acrylate, and ester(meth)acrylate. The photosensitive resins include the resins prepared by introducing an ethylenically unsaturated double bond by the known method into, for example, polyester, polyurethane, epoxy resins and acrylic resins.

The ethylenically unsaturated compounds are used singly or in combination. The ethylenically unsaturated compound can be used in an amount of 1 to 200 parts by weight based on 100 parts by weight of the transparent resin.

The photopolymerization initiators noted above include, for example, acetophenone photopolymerization initiators such as 4-phenoxydichloroacetophenone, 4-t-butyldichloroacetophenone, diethoxyacetophenone, 1-(4-isopropylphenyl)-2-hydroxy-2-methylpropan-1-one, 1-hydroxycyclohexyl phenyl ketone, and 2-benzyl-2-dimethylamino-1-(4-morpholinophenyl)-butan-1-one; benzoin photopolymerization initiators such as benzoin, benzoin methyl ether, benzoin ethyl ether, benzoin isopropyl ether, and benzoin dimethyl ketal; benzophenone photopolymerization initiators such as benzophenone, benzoylbenzoic acid, methylbenzoyl benzoate, 4-phenylbenzophenone, hydroxybenzophenone, acrylbenzophenone, 4-benzoyl-4'-methyldiphenyl sulfide; thioxanthone photopolymerization initiators such as thioxanthone, 2-chlorothioxanthone, 2-methylthioxanthone, isopropylthioxanthone, and 2,4-diisopropylthioxanthone; triazine photopolymerization initiators such as 2,4,6-trichloro-s-triazine, 2-phenyl-4,6-bis(trichloromethyl)-s-triazine, 2-(p-methoxy phenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphto-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine, and 2,4-trichloromethyl-(4'-methoxystyryl)-6-triazine; carbazole photopolymerization initiators; and imidazole photopolymerization initiators. The photopolymerization initiators exemplified above can be used singly or in combination. The photopolymerization initiator can be used in an amount of 1 to 50% based on the weight of the ethylenically unsaturated compound described previously.

Further, the composition for the light-scattering film of the present invention may contain a photosensitizer. The photosensitizer includes, for example, α-acyloxy ester, acylphosphine oxide, methyl phenyl glyoxylate, benzyl, 9,10-phenanthrene quinone, camphor quinone, ethyl anthraquinone, 4,4'-diethyl isophthalophenone, 3,3',4,4'-tetra(t-butylperoxycarbonyl)benzophenone, and 4,4'-diethylaminobenzophenone. These photosensitizers may be used singly or in combination. The photosensitizer can be used in an amount of 1 to 100% based on the weight of the photopolymerization initiator.

In order to form a uniform light-scattering film, the composition for the light-scattering film of the present invention preferably contains a solvent. The solvent includes, for example, cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl n-amyl ketone, propylene glycol monomethyl ether, propylene glycol monomethyl ether acetate, toluene, methyl ethyl ketone, ethyl acetate, methanol, ethanol, isopropyl alcohol, butanol, isobutyl ketone, and petroleum-based solvents. These solvents can be used singly or in combination. The solvent can be used in an amount of 5 to 500 parts by weight based on 100 parts by weight of the transparent resin.

In order to improve the coating properties, the sensitivity and the adhesion properties, additives such as a chain transfer agent, a surfactant, or a silane coupling agent may be added to the composition of the invention. These additives can be used in an amount of 0.01 to 100 parts by weight based on 100 parts by weight of the transparent resin.

The composition for the light-scattering film of the present invention can be prepared by mixing and dispersing the components of the composition by using various dispersion apparatuses such as a shaker, a disper, a sand mill, and an attritor.

It is desirable to remove coarse particles having a diameter of 5 μm or more and dusts mixed in the composition from the composition of the present invention by using, for example, a sintered filter or a membrane filter.

The light-scattering film will now be described.

The light-scattering film is prepared by coating a transparent substrate such as a glass plate with the composition for the light-scattering film of the present invention by a coating method such as a spin coating method, a slit coating method, or a roll coating method, followed by drying the coated film of the composition and irradiating, as required, the coated film with an active energy beam. Where the light-scattering film is prepared by the patterning method, a transparent substrate is coated first with the composition for the light-scattering film, followed by drying the coated film and subsequently irradiating the coated film with an active energy beam from the coated side of the film with a photomask disposed on the coated film. Further, the coated film is dipped in a solvent or an alkali developing liquid, or is sprayed with a developing liquid, so as to remove the portion that was not irradiated with the active energy beam. In other words, the uncured portion is removed so as to develop the pattern formed by the photomask so as to obtain a pattern of the desired shape.

The thickness of the coated film of the composition for the light-scattering film is preferably 0.2 to 5.0 μm after the drying of the coated film. It is more desirable that the thickness of the coated film is 0.5 to 3.5 μm for obtaining a good balance between the coating properties and the light scattering properties.

An aqueous solution of, for example, sodium carbonate or sodium hydroxide can be used as the alkali developing liquid. It is also possible to use an organic alkali such as dimethylbenzylamine or triethanolamine for the alkali developing solution. Also, it is possible to add an antifoaming agent or a surfactant to the developing liquid.

Incidentally, in order to improve the exposure sensitivity to the active energy beam, it is possible to form a. water-soluble resin film or an alkali-soluble resin film such as a polyvinyl alcohol film or a water-soluble acrylic resin film on the coated film of the composition for the light-scattering film after the drying step of the composition, followed by drying the water-soluble resin film or the alkali-soluble resin film so as to form a film effective for preventing the polymerization from being inhibited by oxygen. In this case, the coated film is irradiated with an active energy beam from the coated side of the composition.

An electron beam, an ultraviolet light and a visible light having a wavelength of 400 to 500 nm can be used as the active energy beam. It is possible to use, for example, a thermoelectron radiating gun, or an electric field radiating gun as the source of the electron beam irradiating the coated film from the coated side of the composition for the light-scattering film of the present invention. Also, it is possible to use, for example, a high pressure mercury lamp, an ultra high pressure mercury lamp, a metal halide lamp, a gallium lamp, a xenon lamp, or a carbon arc lamp as the light source of the ultraviolet light and the visible light having a wavelength of 400 to 500 nm. To be more specific, an ultra high pressure mercury lamp or a xenon lamp is used in many cases because these lamps are used as spot light sources and are stable in brightness. The amount of the active energy beam irradiating the coated film from the coated side of the composition can be set appropriately within a range of 5 to 1000 mJ. The amount of the active energy beam is preferably set at 20 to 300 mJ because the amount of the active energy beam-can be controlled easily in this case in the process of forming the light-scattering film.

The present invention will now be described more in detail by way of Examples. In the following Examples, the expressions "parts" and "%" denote "parts by weight" and "% by weight", respectively, unless otherwise specified.

Synthesis of Resin Fine Particles 1:

A reaction vessel equipped with a stirrer, a reflux condenser, a thermometer and a nitrogen gas introducing pipe was charged with 68.5 parts of methanol, 16.32 parts of water, 12.75 parts of methyl methacrylate (manufactured by Wako Junyaku K.K.), 1.5 parts of trifluoroethyl methacrylate (manufactured by Wako Junyaku K.K.) and 0.75 part of allyl methacrylate (manufactured by Wako Junyaku K.K.), and the dissolved oxygen was removed by allowing a nitrogen gas to flow into the reaction vessel. After the reaction vessel was heated to 60° C., a solution of 0.025 part of 2,2'-azobis(2-amidinopropane)dihydrochloride (nonionic polymerization initiator; "V-50" manufactured by Wako Junyaku K.K.) in 0.5 parts of ion-exchanged water was added together with 0.003 part of 2,2'-azobis(4-methoxy-2,4-dimethylvaleronitrile ("V-70" manufactured by Wako Junyaku K.K.) After the reaction mixture was stirred for 6 hours while heating the reaction mixture, 0.015 part of benzoyl peroxide ("Niper BW" manufactured by Nippon Fat and Oil Co., Ltd.) was added, followed by further stirring the reaction mixture for 2 hours while heating the reaction mixture so as to obtain a monodisperse fluorine-containing resin fine particles dispersion containing 15% of solids, having an average particle diameter of 2.10 μm, and having a variation coefficient of the particle diameter of 3.60%. Then, cyclohexanone was added, followed by carrying out a stripping process so as to obtain a monodisperse cyclohexanone dispersion of the fine particles of fluorine-containing resin, containing 20% of solids components.

Synthesis of Resin Fine Particles 2 to 7

Polymerization was performed as in the synthesis of the resin fine particles 1, except that the composition of the solvent, the composition of the monomers, and the amount of the nonionic polymerization initiator were changed as shown in Table 1, followed by performing the stripping process so as to obtain a monodisperse cyclohexanone dispersion of the fine particles of fluorine-containing resin, containing 20% of the solids.

Table 2 shows the synthesizing conditions, the average particle diameter and the variation coefficient of the particle diameter of the fluorine-containing resin fine particles. For determining the average particle diameter and the variation coefficient of the particle diameter of the fluorine-containing resin fine particles, the resin fine particles were observed with an optical microscope "BX60" manufactured by Olympus Optical Co., Ltd. and the diameters of 100 resin fine particles were actually measured by using an image analyzing-measuring software "Mac Scope" manufactured by Mitani Shoji K.K.

TABLE 1

| Resin particles | Solvent composition (parts) | Monomer composition (parts) | Amount of first monomer | Nonionic Initiator (parts) |
|---|---|---|---|---|
| 1 | Methanol/water = 68.5/16.32 | MMA/M-3F/AMA = 12.75/1.5/0.75 | 10% by weight | 0.003 |
| 2 | Methanol/water = 75.0/9.97 | MMA/M-3F/AMA = 6.75/7.5/0.75 | 50% by weight | 0.008 |
| 3 | Methanol/water = 75.0/9.97 | MMA/M-3F/AMA = 6.75/7.5/0.75 | 50% by weight | 0.006 |
| 4 | Methanol/water = 75.0/9.97 | MMA/M-3F/AMA = 6.75/7.5/0.75 | 50% by weight | 0.003 |
| 5 | Methanol/water = 75.0/9.97 | MMA/M-3F/AMA = 5.25/9.00/0.75 | 60% by weight | 0.008 |
| 6 | Methanol/water = 59.0/25.8 | MMA/AMA = 14.25/0.75 | 0 | 0.005 |
| 7 | Methanol/water = 75.0/9.81 | MMA/M-3F/AMA = 3.75/10.5/0.75 | 70% by weight | 0.014 |

The abbreviations shown in Table 1 are as follows:
MMA: methyl methacrylate;
AMA: allyl methacrylate;
M-3F: trifluoroethyl methacrylate;

TABLE 2

| Resin particles | Average particle diameter (μm) | Variation coefficient (%) | Theoretical refractive index (nD) |
|---|---|---|---|
| 1 | 2.10 | 3.60 | 1.486 |
| 2 | 2.09 | 2.90 | 1.464 |
| 3 | 1.78 | 4.60 | 1.464 |
| 4 | 1.51 | 4.80 | 1.464 |
| 5 | 1.57 | 4.20 | 1.460 |
| 6 | 2.11 | 3.30 | 1.491 |
| 7 | 1.59 | 4.00 | 1.454 |

EXAMPLES 1 TO 8 AND COMPARATIVE EXAMPLES 1 AND 2

The composition for the light-scattering film given below including the cyclohexanone dispersion of the resin fine particles shown in Table 3 was mixed by using a multi-shaker ("MMS-310" manufactured by Irar Inc.). Then, a glass plate sized at 100 mm×100 mm×1.1 mm was coated with the composition by using a spin coater, followed by drying the coated film at 70° C. for 20 minutes. Further, the dried film was exposed to an ultraviolet light with an accumulated light amount set at 150 mJ by using an ultra high pressure mercury lamp, followed by heating the resin film at 230° C. for one hour, thereby obtaining a light-scattering film having a thickness of about 3 μm. In Example 8, "Tosspar 120" (trade name of the fine particles of silicon resin manufactured by Toshiba Silicone K.K., which have a refractive index of 1.45 and an average particle diameter of 2.0 μm) was used as the resin fine particles other than the fluorine-containing resin fine particles. Tosspar 120 is a powder, and cyclohexanone was added such that the resultant system contained 20% of solids.

| Composition for Light-Scattering Film: | |
|---|---|
| Cyclohexanone dispersion of resin fine particles (20% of solids) | 33.6% |
| Propylene glycol monomethyl ether acetate solution of fluorene resin having a refractive index of 1.6 and a weight average molecular weight of 4000 | 24.6% |
| Dipentaerythritol penta and hexa acrylate ("Aronics M-402" manufactured by Toa Gosei K.K.) | 7.5% |
| Photopolymerization initiator ("Irgacure 907" manufactured by Ciba Specialty Chemicals) | 0.9% |
| Nonionic surfactant | 1.0% |
| Cyclohexanone | 32.4% |

The light-scattering films obtained in Examples 1 to 8 and Comparative Examples 1 and 2 were measured for the haze and the surface roughness (Ra) by using HAZEMETER HM-150 manufactured by Murakami Shikisai Gijutsu Kenkyujo K.K. and Dektak 3030 manufactured by Nippon Shinku Gijutsu K.K., respectively. The results are shown in Table 3. Further, the moire was evaluated by visual observation in respect of the light-scattering films obtained in Examples 1 to 8 and Comparative Examples 1 and 2. The results are shown also in Table 3. Incidentally, the variation coefficient of the particle diameter of the resin fine particles is also shown in Table 3. Where the resin fine particles included a plurality of different kinds of resin fine particles, the variation coefficient of the particle diameter of the entire fine particles was calculated by a method similar to the calculating method of the variation coefficient of the particle diameter of the fluorine-containing resin fine particles described previously.

TABLE 3

| | Resin particles | Variation coef. (%) | Haze (−) | Ra (Å) | Moire |
|---|---|---|---|---|---|
| Ex. 1 | Resin particles 1/Resin particles 5 = 1/1 (weight ratio) | 14.95 | 64.4 | 136 | None |
| Ex. 2 | Resin particles 2 | 2.90 | 76.3 | 196 | Very slight |
| Ex. 3 | Resin particles 3 | 4.60 | 66.8 | 153 | Very slight |
| Ex. 4 | Resin particles 2/Resin particles 4 = 1/1 (weight ratio) | 16.53 | 68.0 | 180 | None |
| Ex. 5 | Resin particles 2/Resin particles 3/Resin particles 5 = 1/1/1 (weight ratio) | 12.40 | 70.2 | 160 | None |
| Ex. 6 | Resin particles 2/Resin particles 3 = 1/1 (weight ratio) | 8.80 | 71.0 | 160 | None |
| Ex. 7 | Resin particles 2/Resin particles 3/Resin particles 4 = 1/1/1 (weight ratio) | 13.80 | 68.0 | 142 | None |
| Ex. 8 | Resin particles 3/Tosspar 120 = 1/1 (weight ratio) | 7.50 | 62.5 | 250 | None |
| Comp. Ex. 1 | Resin particles 6 | 3.30 | 52.0 | 200 | Very slight |
| Comp. Ex. 2 | Resin particles 7 | 4.00 | 75.2 | 579 | Very slight |

As apparent from the experimental data for Examples 1 to 8, it is possible to form a light-scattering film having a desired haze by selecting appropriately the average particle diameter and the fluorine content of the fluorine-containing resin fine particles.

It should also be noted that a plurality of different kinds of the fine particles of fluorine-containing resin are used in Examples 1 and 4 to 7, with the result that the variation coefficient of the particle diameter of the entire fine particles was allowed to fall within a more preferable range of 6.0 to 20.0% so as to prevent the moire generation.

Also, in Example 8, resin fine particles having a low refractive index were also used together with the fluorine-containing resin fine particles, and the variation coefficient of the particle diameter of the entire resin fine particles was controlled to fall within a more preferable range of 6.0 to 20.0%. As a result, it was possible to obtain a light-scattering film having a high haze and free from moire.

On the other hand, the resin fine particles 6 used in Comparative Example 1 did not contain fluorine, leading to a low haze and resulting in failure to obtain a sufficient light scattering capability.

Further, the resin fine particles 7 used in Comparative Example 2 contained an excessively large amount of fluorine, i.e., 70% of fluorine, with the result that the resin fine particles were agglomerated in the coating step so as to increase markedly the surface roughness (Ra). Thus, it was impossible to obtain a light-scattering film having the resin fine particles uniformly dispersed therein.

Synthesis of Resin Fine Particles 8

A reaction vessel equipped with a stirrer, a reflux condenser, a thermometer, and a nitrogen gas introducing pipe was charged with 74.0 parts of methanol, 11.0 parts of water, 0.375 part of 2-acryloyloxyethylhexahydrophthalic acid ("HOA-HH" manufactured by Kyoeisha Kagaku K.K.), 0.375 part of a polyethylene glycol monomethacrylate ("Blenmer PE-200" manufactured by Nippon Fat and Oil Co., Ltd.), 13.5 parts of trifluoroethyl methacrylate (Wako Junyaku K.K.) and 0.75 part of allyl methacrylate (Wako Junyaku K.K.), and a nitrogen gas was allowed to flow into the reaction vessel to remove the dissolved oxygen. After the reaction vessel was heated to 60° C., a solution of 0.025 part of 2,2'-azobis(2-amidinopropane)dihydrochloride (a nonionic polymerization initiator; "V-50" by Wako Junyaku K.K.) in 0.5 part of ion-exchanged water was introduced into the reaction vessel together with 0.02 part of 2,2'-azobis(4-methoxy-2,4-dimethylvaleronitrile ("V-70" manufactured by Wako Junyaku K.K.). After the reaction mixture was stirred for 6 hours while heating the reaction mixture, 0.015 part of benzoyl peroxide ("Niper BW" manufactured by Nippon Fat and Oil Co., Ltd.) was added, followed by further stirring the reaction mixture for 2 hours while heating the s reaction mixture so as to obtain a monodisperse fluorine-containing resin fine particles dispersion containing 15% of solids, having an average particle diameter of 1.71 μm, and having a variation coefficient of the particle diameter of 5.40%. Then, cyclohexanone was added to the dispersion thus obtained, followed by carrying out a stripping process so as to obtain a monodisperse fluorine-containing resin fine particles dispersion in cyclohexanone, containing 20% of solids.

Synthesis of Resin Fine Particles 9 to 14

Polymerization was performed as in the synthesis of the resin fine particles 8, except that the composition of the solvent, the composition of the monomers, and the charging amount of the nonionic polymerization initiator were changed as shown in Table 4, followed by performing the stripping process so as to obtain a monodisperse fluorine-containing resin fine particles dispersion in cyclohexanone, containing 20% of solids.

Table 4 shows the synthesizing conditions of the fluorine-containing resin fine particles. Also, Table 5 shows the average particle diameter, the variation coefficient of the particle diameter, and theoretical refractive index of the fluorine-containing resin fine particles, which were measured as described previously.

TABLE 4

| Resin particles | Solvent composition (parts) | Monomer composition (parts) | First monomer content | Nonionic polymerization initiator (parts) |
| --- | --- | --- | --- | --- |
| 8 | Methanol/water = 74.0/11.0 | HOA-HH/Blenmer PE-200/M-3F/AMA =0.375/0.375/13.5/0.75 | 90% by weight | 0.02 |
| 9 | Methanol/water = 74.0/11.0 | HOA-HH/Blenmer PE-200/M-3F/AMA =0.375/0.375/13.5/0.75 | 90% by weight | 0.04 |
| 10 | Methanol/water = 74.0/11.0 | MAA/Blenmer PE-200/M-3F/AMA = 0.375/0.375/13.5/0.75 | 90% by weight | 0.02 |
| 11 | Methanol/water = 74.0/11.0 | HO-HH/Blenmer PE-200/M-3F/AMA = 0.375/0.375/13.5/0.75 | 90% by weight | 0.02 |
| 12 | Methanol/water = 71.0/14.0 | HOA-HH/Blenmer PE-200/M-3F/AMA/MMA = 0.375/0.375/13.5/0.75/6 | 50% by weight | 0.015 |
| 13 | Methanol/water = 75.0/9.97 | MMA/M-3F/AMA = 6.75/7.5/0.75 | 50% by weight | 0.006 |
| 14 | Methanol/water = 75.0/9.81 | MMA/M-3F/AMA = 0.75/13.5/0.75 | 90% by weight | 0.014 |

The abbreviations shown in Table 4 are as follows:
MMA: methyl methacrylate;
AMA: allyl methacrylate;
M-3F: trifluoroethyl methacrylate;
MAA: methacrylic acid;
HOA-HH: 2-acryloylethyl hexahydrophthalic acid manufactured by Kyoeisha Kagaku K.K.;
HO-HH: 2-methacryloylethyl hexahydro phthalic acid manufactured by Kyoeisha Kagaku K.K.;
Blenmer PE-200: polyethylene glycol monomethacrylate manufactured by Nippon Fat and Oil Co., Ltd.

TABLE 5

| Resin particles | Average particle diameter (μm) | Variation coefficient (%) | Theoretical refractive index (nD) |
|---|---|---|---|
| 8 | 1.71 | 5.40 | 1.454 |
| 9 | 2.09 | 2.90 | 1.454 |
| 10 | 1.70 | 3.45 | 1.454 |
| 11 | 1.68 | 4.32 | 1.454 |
| 12 | 1.74 | 3.69 | 1.464 |
| 13 | 1.78 | 4.60 | 1.464 |
| 14 | 1.59 | 4.00 | 1.454 |

EXAMPLES 9 TO 14 AND COMPARATIVE EXAMPLES 3 AND 4

Light-scattering films were formed as in Examples 1 to 8, except that the compositions for the light-scattering film including the cyclohexanone dispersion of the resin fine particles shown in Table 6 were used. In Example 13, "Tosspar 120" (silicone resin fine particles manufactured by Toshiba Silicone K.K.) was used as the resin fine particles other than the fluorine-containing resin fine particles. Tosspar 120 is a powder, and cyclohexanone was added such that the resultant system contained 20% of solids.

The haze and the surface roughness (Ra) of each of the light-scattering films obtained in Examples 9 to 14 and Comparative Examples 3 and 4 were measured as in Examples 1 to 8, and the moire was evaluated by the visual observation. The results are shown also in Table 6. Table 6 further shows the variation coefficient of the particle diameter of the resin fine particles.

TABLE 6

| | Resin particles | Variation Coef. (%) | Haze (−) | Ra (Å) | Moire |
|---|---|---|---|---|---|
| Ex. 9 | Resin particles 8 | 5.40 | 83.4 | 136 | Very slight |
| Ex. 10 | Resin particles 10 | 3.45 | 82.6 | 170 | Very slight |
| Ex. 11 | Resin particles 11 | 4.32 | 83.2 | 152 | Very slight |
| Ex. 12 | Resin particles 8/Resin particles 9 = 1/1 (weight ratio) | 10.80 | 85.6 | 220 | None |
| Ex. 13 | Resin particles 8/Tosspar 120 = 1/1 (weight ratio) | 8.90 | 81.6 | 250 | None |
| Ex. 14 | Resin particles 12 | 3.69 | 74.0 | 165 | Very slight |
| Comp. Ex. 3 | Resin particles 13 | 4.60 | 66.8 | 153 | Very slight |
| Comp. Ex. 4 | Resin particles 14 | 4.00 | 75.2 | 579 | Very slight |

As apparent from the experimental data for Examples 9 to 14, it is possible to form a light-scattering film having a high haze and excellent in the surface smoothness in the case where the fluorine-containing resin fine particles are formed of a copolymer including a hydrophilic group-containing ethylenically unsaturated monomer.

In Example 12, two kinds of the fine particles of fluorine-containing resin differing from each other in the particle diameter were used. As a result, the variation coefficient of the particle diameter of the entire fine particles falls within a more preferable range of 6.0 to 20.0%. Therefore, the moire was not generated in the formed light-scattering film.

In Example 13, resin fine particles having a low refractive index, which were other than the fluorine-containing resin fine particles, were used together with the fluorine-containing resin fine particles. In addition, the variation coefficient of the particle diameter of the entire resin fine particles was controlled to fall within a more preferable range of 6.0 to 20.0%. Therefore, it was possible to obtain a light-scattering film having a high haze and free from the moire.

In Example 14, the amount of the fluorine-containing monomer was 50%, which was relatively small. However, in this Example, the fluorine-containing resin fine particles formed of a copolymer having a hydrophilic group-containing ethylenically unsaturated monomer were used. Thus, the haze was higher than that in the case (Comparative Example 3) where resin fine particles formed of a copolymer of the same amount of the fluorine-containing monomer and another monomer not containing the hydrophilic group-containing ethylenically unsaturated monomer were used.

In Comparative Example 4, the fluorine-containing resin fine particles formed of a copolymer having a large amount (90%) of the fluorine-containing monomer and not having the hydrophilic group-containing ethylenically unsaturated monomer were used. As a result, the fluorine-containing resin fine particles were agglomerated in the coating step. Therefore, the surface of the formed light-scattering film was extremely rough, resulting in failure to obtain a light-scattering film having the resin fine particles uniformly dispersed therein.

As described above, it is possible to form a light-scattering film excellent in the light scattering capability and in the surface smoothness by using the composition for the light-scattering film of the present invention.

What is claimed is:

1. A composition for a light-scattering film, comprising:
    fluorine-containing resin fine particles each comprising a copolymer of 10 to 90% by weight of a first ethylenically unsaturated monomer containing fluorine with 89 to 5% by weight of a second ethylenically unsaturated monomer containing no fluorine and no hydrophilic group and 1 to 10% by weight of a third ethylenically unsaturated monomer containing a hydrophilic group, the particles having an average particle diameter of 0.8 to 5.0 μm; and
    a transparent resin having a refractive index of 1.50 to 1.70
    wherein the third ethylenically unsaturated monomer is selected from the group consisting of polyethylene glycol (meth)acrylate, polypropylene glycol (meth)acrylate, polyethylene glycol polypropylene glycol (meth)acrylate, 2-(meth)acryloyloxyethylphthalic acid, and 2-(meth)acryloyloxyethylhexahydrophthalic acid.

2. The composition according to claim 1, wherein the fluorine-containing resin fine particles comprise a copolymer prepared by copolymerization of the first monomer with the second monomer and the third monomer in the presence of a polymerization initiator represented by a formula (1):

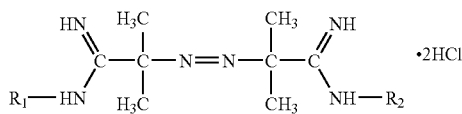

where $R_1$ and $R_2$ independently denote a hydrogen atom, an alkyl group or an aromatic group, or formula (2):

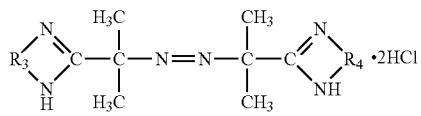

where $R_3$ and $R_4$ independently denote an alkylene group or a divalent aromatic group.

3. The composition according to claim 1, wherein the second monomer comprises an ethylenically unsaturated monomer having (meth)acrylic acid residue and vinyl group.

4. The composition according to claim 1, wherein the composition further comprises another ethylenically unsaturated compound.

5. The composition according to claim 1, wherein the fluorine-containing resin fine particles comprise two or more kinds of fluorine-containing resin fine particles different from each other in average particle diameter, and a variation coefficient of the particle diameter of the entire fluorine-containing resin fine particles is 2.0 to 20.0%.

6. The composition according to claim 1, wherein the composition further comprises other particles having a refractive index of 1.30 or more, but less than 1.50 and an average particle diameter of 0.8 to 5.0 μm, and a variation coefficient of the particle diameter of the entire particles including the other particles and the fluorine-containing resin fine particles is 2.0 to 20.0%.

7. A light-scattering film prepared by using the composition according to claim 1.

* * * * *